United States Patent [19]

Tveter

[11] 3,717,029
[45] Feb. 20, 1973

[54] TORQUEMETER
[75] Inventor: Richard S. Tveter, Glenview, Ill.
[73] Assignee: S. Himmelstein and Company
[22] Filed: Oct. 23, 1968
[21] Appl. No.: 769,904

[52] U.S. Cl. ..............................................73/136 A
[51] Int. Cl. ..............................................G01l 3/10
[58] Field of Search......................73/134–138, 70.1

[56] References Cited

UNITED STATES PATENTS

| 2,445,427 | 7/1948 | Godsey, Jr. | 73/136 |
| 2,531,228 | 11/1950 | Macgeorge | 73/136 |
| 2,548,397 | 4/1951 | Schaevitz | 73/136 |

FOREIGN PATENTS OR APPLICATIONS

| 453,819 | 1/1949 | Canada | 73/136 |
| 784,733 | 10/1957 | Great Britain | 73/136 |

Primary Examiner—Charles A. Ruehl
Attorney—Hofgren, Wegner, Allen, Stellman & McCord

[57] ABSTRACT

A torquemeter for use in measuring torque in a rotary drive including a rotary transformer having a rotor portion on a carrier formed of material having high electrical conductivity and low magnetic characteristics for effectively precluding cross talk or flux leakage paths through the shaft and effectively precluding spurious signals being generated in the torquemeter control as from shaft magnetostriction effects and the like. The torquemeter further includes a control comprising a standard strain gage carrier system. The rotary transformer comprises a high performance wide band transformer. The control avoids the use of resonant circuits and includes means for electrical balancing thereof on the stationary side of the rotary transformer.

7 Claims, 2 Drawing Figures

Inventor:—
Richard S. Tveter,
By Hofgren, Wegner, Allen,
Stellman & McCord Attys.

TORQUEMETER

BACKGROUND OF THE INVENTION

1. Field of the Invention

This invention relates to torquemeters and in particular to torquemeters utilizing a rotary transformer.

2. Description of the Prior Art

In one form of conventional torque measuring system, a strain gage is provided on a rotary member and is utilized in conjunction with an associated control to provide an output signal corresponding to the torque in the rotary member. The known systems utilize resonant circuit portions and in certain known systems, both series resonant and parallel resonant circuits are utilized. Further, in certain known torque measuring systems, balancing thereof is effected by adjusting portions of the rotary section of the control, such as a Wheatstone bridge portion thereof. Still further, in the known systems, the input and output sections of associated rotary transformers are carried on the rotary member so as to introduce spurious signals resulting from twisting of the drive member therebetween as a result of the transmitted torque. Such effects arise both from angular displacement of the rotary transformer sections and by magnetostriction effects in the drive member. Further, cross talk may occur between the different portions of the rotary transformer through the rotary drive member which cross talk is affected by magnetostriction characteristics in the drive member.

SUMMARY OF THE INVENTION

The present invention comprehends an improved torquemeter utilizing a rotary transformer and an associated control system for measuring torque in a rotary drive. The invention comprehends providing means for isolating the rotary transformer magnetically and physically from the drive member while yet providing for the carrying of the rotary section of the transformer for rotation with the drive member. Thus, the invention comprehends the provision of such an isolation means arranged to be carried by the drive member and, in turn, carrying the rotary portion of the rotary transformer. The isolation means effectively precludes cross talk between the input and output rotary sections of the transformer, and effectively precludes transmission of drive member stresses to the transformer. The isolation member further defines an electrostatic shield around the rotary drive member and prevents leakage flux flow between the transformer input and output section through the drive member. The use of the isolation means permits the use of a wide variety of materials in the construction of the rotary drive member which materials may be selected for their mechanical characteristics as the magnetic characteristics thereof are prevented from affecting the control. The isolation means further electrostatically shields the transformer sections from each other and reduces cross talk therebetween.

The rotary transformer herein utilizes high performance wide band transformer sections. The control eliminates the need for resonant circuits in any portion thereof as the transformers provide sufficient sensitivity. The control is electrically balanced in the stationary portion thereof. Thus, conventional carrier system controls utilizing conventional bridge balancing means may be used.

More specifically, the invention comprehends a torquemeter including a carrier means formed of material having high electrical conductivity and low magnetic characteristics, means for mounting the carrier means for rotation with a rotary drive, transformer means having a rotor portion carried by the carrier means and a stator portion fixed adjacent the rotor portion in electrical coupled relationship to the rotor portion, means responsive to a torque in the rotary drive for providing a corresponding electrical control effect on the rotor portion of the transformer, and means electrically connected to the stator portion of the transformer for providing a drive torque indication corresponding to the control effect on the rotor portion.

Further more specifically, the invention comprehends a torquemeter for measuring torque in a rotary drive including a rotary transformer having a fixed input stator section, a fixed output stator section, a first rotor section carried for rotation with the drive in electrically coupled relationship to the input stator section and a second rotor section carried for rotation with the drive in electrically coupled relationship to the output stator section, the input stator and first rotor sections defining a high performance wide band input transformer section, and the second rotor and output stator sections defining a high performance wide band output transformer section, electrical control means having a stationary portion connected to the stator sections, and rotary portion carried by the rotary drive and connected to the rotor sections, the control providing an input signal controlled by the rotary control portion to provide an output signal in the output section corresponding to torque in the rotary drive whereby the output signal comprises a torque indication signal.

BRIEF DESCRIPTION OF THE DRAWING

Other features and advantages of the invention will be apparent from the following description taken in connection with the accompanying drawing wherein.

DESCRIPTION OF THE PREFERRED EMBODIMENT

Figure 1:
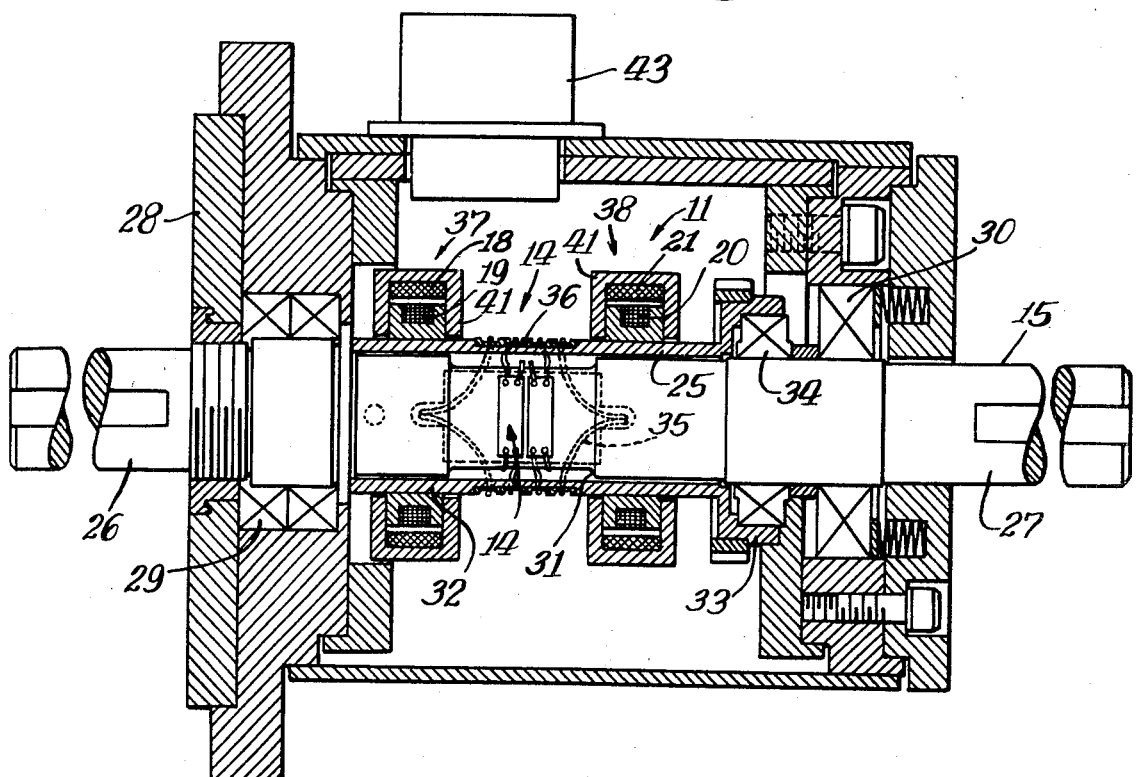
FIG. 1 is a diametric section of a portion of a torquemeter embodying the invention.

In the exemplary embodiment of the invention as disclosed in the drawing, a torquemeter generally designated 10 is shown to include a rotary transformer generally designated 11 and an electrical control means generally designated 12 including a stationary portion 13 and a rotary portion 14 interconnected by the rotary transformer 11. Briefly, the stationary control portion 13 provides an input signal which is controlled by the rotary control portion 14 to then provide an output signal in the stationary portion 13 corresponding to the torque transmitted through a drive member 15.

The control portion 14 may comprise a conventional Wheatstone bridge foil strain gage means having bridge arms 16 secured directly to the drive member 15. Such foil strain gages provide improved operation by virtue of their low electrical impedance and excellent temperature and long life characteristics.

Figure 2:
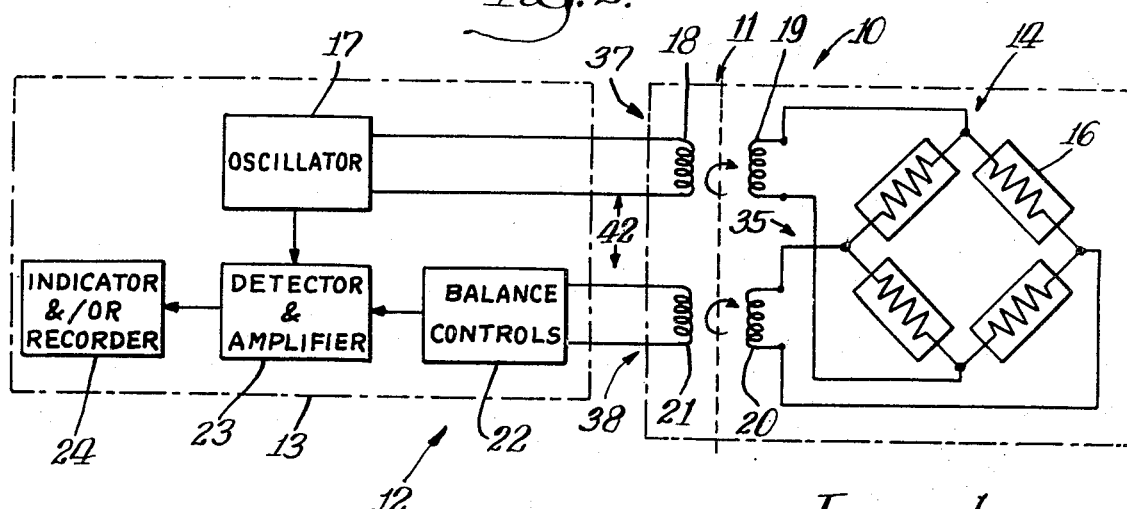
FIG. 2 is a schematic wiring diagram of the torquemeter.

As shown in FIG. 2, the stationary control portion 13 includes an oscillator 17 which provides excitation through the primary stator input coil 18 and the secondary rotor coil 19 to the bridge 14. The strain gage bridge 14 functions in the conventional manner to vary the signal transmitted therethrough from the coil 19 to the primary rotor coil 20 as a function of a strain induced in the drive member 15 by torque being transmitted therethrough. The output secondary coil 21 of the transformer 11 delivers the output signal through a balance control 22 to a detector and amplifier portion 23 of the stationary control portion 13. The resultant signal is then delivered as desired to an indicator and/or recorder means 24 for readout of the drive member torque.

The stationary control portion 13 may comprise a standard commercially available carrier system having an excitation frequency in the range of 1 to 25 kHz.

Improved operation of torquemeter 10 is provided by a novel arrangement of the rotary transformer 11 to eliminate spurious signals as occur in conventional rotary transformer torquemeters. More specifically, the rotor coils 19 and 20 are coaxially mounted on an isolation tube 25 formed of a material having high electrical conductivity and low magnetic characteristics. Illustratively, the isolation tube may be formed of aluminum, copper, and the like. The drive member 15 herein comprises a through-shaft having exposed outer ends 26 and 27 adapted for coupling thereof coaxially in a drive system. The shaft is rotatably journalled in an outer housing by means of suitable bearings 29 and 30. The shaft is further provided with an annular recess 31 in which the strain gage bridge 14 is disposed. The isolation tube 25 includes an end portion 32 secured to the drive shaft 15 as by being threaded thereonto to extend superjacent the recess 31 and therepast to a flange end 33 rotatably journalled on a bearing 34. The rotor coil 19 is affixed to the tube 25 adjacent end 32 and the rotor coil 20 is affixed to isolation tube 25 adjacent flange end 33. Wires 35 leading from coil 19 to the strain gage 14 and from the strain gage 14 to the coil 20 extend outwardly through the recess 31 and tube 25. Connections thereto may be made by means of a suitable terminal strip 36 carried on the isolation tube 25 intermediate the rotary transformer sections 37 and 38. More specifically, input rotary transformer section 37 includes the fixed stator coil 18 and rotor coil 19 and output rotary transformer section 38 includes the rotor coil 20 and fixed output stator coil 21. Each of the transformer sections 37 and 38 further includes rotor and stator core elements 41 for improved efficiency of operation of the rotary transformer. The connections from the rotary transformer 11 to the control portion 13 are through suitable wires 42 which may be brought outwardly through the housing 28 through a suitable conventional connector 43.

As the isolation tube 25 effectively isolates the transformer sections 37 and 38 both from each other and from the shaft 15, improved operation of the torquemeter 10 is obtained. Shaft 15 may be formed of any suitable material, such as stainless steel, regardless of the magnetic characteristics thereof as such characteristics will not effect the operation of the isolation tube. More specifically, in the conventional rotary transformer wherein the rotor coils are carried directly on the drive shaft, the magnetic properties of the drive shaft affect the magnetic circuit between transformer sections and provide a variable effect on cross talk or flux leakage therebetween. The conventional shaft materials undergo magnetostriction as a result of variable torques produced therein and resultingly provide a variable, or nonlinear, spurious torque signal, affecting the accuracy of the torquemeter. The isolation tube 25, however, not only functions to isolate the transformer sections magnetically, but also effectively precludes transmission of shaft stresses between the transformer sections by virtue of the effectively cantilevered arrangement of the tube 25 obtained by the fixed mounting thereof at end 32 on the drive shaft 15. The electrical conductivity of the tube 25 provides an electrostatic shield around the shaft and a partial electrostatic shield between the two sections 37 and 38. Leakage flux between the transformer sections 37 and 38 is prevented from passing through the drive shaft 15 and, thus, magnetostriction and similar effects in the drive shaft do not produce nonlinearities in the torquemeter readout. The transformer sections 37 and 38 comprise wide band high performance transformers eliminating the need for resonant or peaked circuits in the control means 12. Thus, an improved accurate, highly efficient torque measurement is obtained by means of torquemeter 10 while yet the torquemeter is extremely simple and economical of construction.

The torquemeter 10 is adapted for use with both absorbing and motoring dynamometers measuring total shaft load including windage, friction and acceleration torques. The output signal provided by detector and amplifier portion 23 comprises an electrical signal which is adapted for operating any suitable indicator or recorder device, such as device 24 and other automatic data acquisition devices as desired. The torquemeter 10 provides accurate torque signals with high frequency response and, thus, is adapted to provide load feedback signals corresponding to steady state vibratory and peak conditions. Torquemeter 10 continuously measures the shaft torque over wide dynamic ranges without time delay inherent in reaction measurement or motor current measurement devices.

While I have shown and described one embodiment of my invention, it is to be understood that it is capable of many modifications. Changes, therefore, in the construction and arrangement may be made without departing from the spirit and scope of the invention as defined in the appended claims.

I claim:

1. A torquemeter for measuring torque in a rotary drive, comprising: carrier means formed of material having high electrical conductivity and low magnetic characteristics; means for mounting said carrier means for rotation with a rotary drive; transformer means having a rotor portion comprising a pair of coils spaced axially on said carrier means and a stator portion fixed adjacent said rotor portion in electrical coupled relationship to said rotor portion, said carrier extending axially between said coils; means responsive to a torque in the rotary drive for providing a corresponding electrical control effect on the rotor portion of said transformer; and means electrically connected to the stator portion of said transformer for providing a drive torque indication corresponding to said control effect on the rotor.

2. The torquemeter of claim 1 wherein said stator portion of the transformer includes an input section and an output section spaced from said input section, said carrier means effectively precluding cross talk between said sections through said rotary drive.

3. The torquemeter of claim 1 wherein said carrier means is arranged to be substantially free of torsional stresses at said transformer to preclude spurious torque indications.

4. The torquemeter of claim 3 wherein said carrier means includes a portion cantilevered from said mounting means, said transformer rotor portion being carried on said cantilevered portion to be free of said torsional stresses.

5. The torquemeter of claim 1 wherein said carrier comprises a tubular element extending about said rotary drive.

6. The torquemeter of claim 5 wherein said mounting means comprises means securing one end of said tubular element fixedly to said rotary drive.

7. The torquemeter of claim 1 wherein said transformer includes an input stator section, a first rotor section associated with said input stator section, an output stator section, and a second rotor section associated with said output rotor section, said rotor sections being spaced substantially apart on said carrier.

* * * * *